G. SHELTON.
Suspenders for Fly-Guards upon Horses.

No. 138,205. Patented April 22, 1873.

WITNESSES.
Wm Howard
H. L. Perrine

INVENTOR.
Gillum Shelton
By Daniel Breed Atty.

UNITED STATES PATENT OFFICE.

GILLUM SHELTON, OF NORMAL, ILLINOIS.

IMPROVEMENT IN SUSPENDERS FOR FLY-GUARDS UPON HORSES.

Specification forming part of Letters Patent No. 138,205, dated April 22, 1873; application filed March 8, 1873.

*To all whom it may concern:*

Be it known that I, GILLUM SHELTON, of Normal, in the county of McLean and State of Illinois, have invented an improved device or arrangement of straps for fastening or holding the coverings of the legs of animals, of which the following is a specification:

My invention consists of a novel device or arrangement of straps for supporting the coverings of the legs of horses or other animals, and thus preventing the flies from biting the animals.

Figure 1:
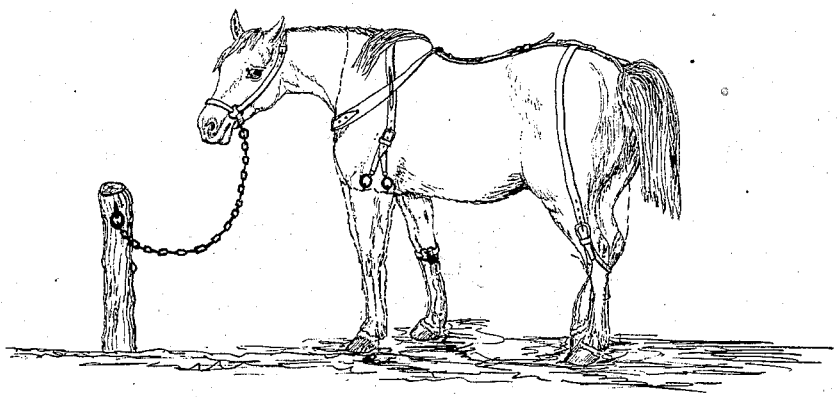
Figure 2:
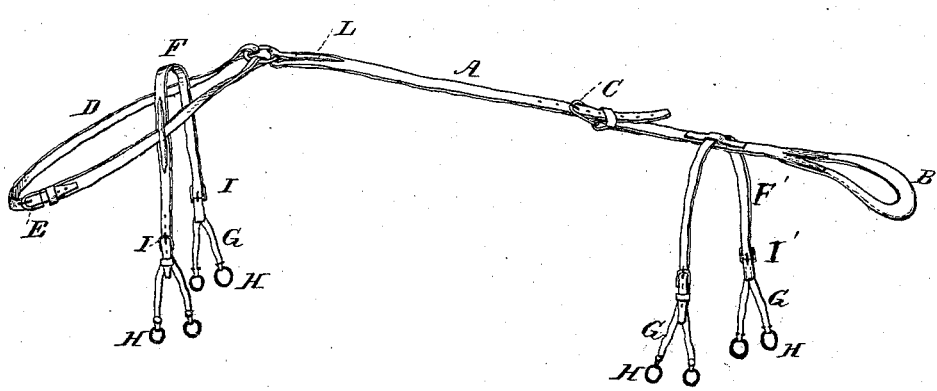

In the accompanying drawing, Figure 1 represents my improved device or arrangement of straps in place upon the horse. Fig. 2 shows the device or straps separate from the horse.

In the construction of my animal-protector or device for holding the coverings of the legs of animals I make a back-strap, A, crupper B, and breast-strap D, having buckles C and E for adjusting the same to the size of the animal. With the above I connect two suspenders, F and F', one passing over the withers and the other over the hips of the animal, and both being provided with buckles I and I' for adjusting their length. Then I attach to the lower ends of these suspenders two branches, G, made of elastic tape, and provided with rings H for attaching the suspenders to cloths or coverings of the legs of the animals, as shown in the drawing.

A surcingle may be put through the loop L, Fig. 2, and used to hold the blanket in place in the usual way.

Having described my invention, I claim—

The above-described straps or suspenders F and F' for fastening and supporting the coverings of the legs of animals, substantially as set forth.

GILLUM SHELTON.

Witnesses:
 DANIEL BREED,
 S. J. REEDER.